Patented June 12, 1945

2,377,975

UNITED STATES PATENT OFFICE 2,377,975

METHOD OF SOLVENT EXTRACTION OF OIL FROM SEEDS

Philip A. Singer and Harold J. Deobald, Peoria, Ill., assignors to Allied Mills, Inc., a corporation of Indiana No Drawing. Application April 17, 1943, Serial No. 483,527

8 Claims. (Cl. 260—412.4)

This invention relates to the solvent extraction of oil from seeds, and more particularly to the use of isopropanol, and particularly in combination with ethanol, as a solvent.

The use of ethanol as a solvent for the extraction of oil from seeds and grains including soy beans, has for years been considered ideal for the reason that a high degree of solvent efficiency is obtained, and because there are produced oil and meal as finished products which are superior in quality to those resulting from a hydrocarbon or chlorinated hydrocarbon solvent process.

There are, however, certain disadvantages when using ethanol as a solvent, the principal one being the necessity of extracting at temperatures well above the boiling point of the solvent, i. e. extraction under pressure, since at atmospheric pressure ethanol is not an efficient solvent. The operation under pressure presents a rather serious problem in connection with the introduction of the material to be extracted into the extraction equipment when continuous operation is desired. Pressure equipment is of course more expensive and hazardous than equipment built to operate at atmospheric pressure.

It has now been found that isopropanol is also a very efficient extraction agent and has the advantage that extractions can be carried on at temperatures as low as 130–140° F. These temperatures are well below the boiling point of the solvent and, therefore, permit the operation of the process at atmospheric pressure. The results obtained through the use of isopropanol as a solvent are not as satisfactory as those obtained when using ethanol under pressure. When extracting with isopropanol the solvent extract on cooling gives up only about 45% of the extracted oil, the balance remaining in solution in the solvent, whereas under similar conditions of cooling more than 80% of oil present in the ethanol separates. The oil precipitated out of the isopropanol solvent extract is inferior in quality to that precipitated from an ethanol solvent extract. The recovery of the oil remaining in the isopropanol solution is a matter of considerable complication and this oil when recovered will also be found to be inferior in quality to that recovered from the ethanol process.

We have found, however, that by combination of isopropanol and ethanol within a rather narrow range of concentration, the valuable solvent effects of each may be retained without incurring the disadvantages of either. Optimum results are obtained with 70 to 80 parts of ethanol to 30 to 20 parts of isopropanol. The amount of isopropanol may be increased somewhat beyond this range but as it increases the volume of oil precipitatable from the solvent extract also decreases. The percentage of ethanol cannot be carried beyond 80% without requiring the use of a superatmospheric pressure. If the process is carried on in a locality where the atmospheric pressure is relatively low, the ethanol proportion should be substantially lower than in a locality where the atmospheric pressure is naturally higher.

In the extraction of oil from soy beans, a solvent containing 75 parts of ethanol to 25 parts of isopropanol is preferred. This solvent may be used at atmospheric pressure, permits the separation of over 90% of the oil on cooling, and leaves an extracted soy bean flake containing only 0.3% to 0.5% of ether-extractable material. The separated and settled out oil from such a solvent is of the same high purity as oil obtained when using ethanol as a solvent. That is, it is equivalent to what is known in the trade as a "non-break oil" at 600° F. and has excellent color, flavor and odor. The meal is also of the same high purity and contains from 57% to 59% of protein when the flakes are produced from dehulled beans.

The solvent may be used on other seeds or grains, although the relative concentrations may be varied somewhat, depending upon the type of oil encountered. In the claims hereof the term "seed" is used to cover both seeds and grain.

The following describes a suitable process for the extraction of oil from soy beans:

The beans are cleaned, cracked, dried and flaked or they may be cleaned, cracked, flaked and then dried. No claim is made in connection with the preparation of the flake as this is more or less a standard practice. The prepared flake is now delivered to a suitable solvent extraction machine. This may be a machine which would involve batch-wise extraction or it may be a unit in which the extraction is carried on continuously in a counter current extractor, atmospheric pressure extraction being well adapted to continuous processes.

The flakes entering the extraction process should preferably contain not more than 3½% of moisture. This low moisture content of the flake does not bring about any dilution of the solvent so that rectification is not necessary. As a matter of fact, there is a possibility of a concentration of a solvent taking place rather than dilution.

The mixture of ethanol and isopropanol preferably is made up of the common inexpensive stable forms in which these solvents are commercially available, the ethanol being 95% by volume, and the isopropanol 91% by volume. The purity of the solvents used need not be necessarily those stated above, these being given to indicate a desirable alcoholic concentration, but alcohols of somewhat greater or less concentration may be used satisfactorily in our process. In operating our process we maintain temperatures slightly below the boiling point of the mixed solvent, that is, in the neighborhood of 170° F. when the 75–25 mixture is used.

The solvent extract leaving the extraction unit is cooled by any standard type of liquid-cooling device and reduced in temperature to about 80° F. or lower. On leaving the extraction unit the solvent extract when still hot is clear and amber in color. On cooling, the solution becomes turbid immediately because of separation of the oil in globules. These oil globules immediately begin to settle out, and owing to their extreme fineness a settling period of 16 to 20 hours is necessary. After settling, there remains a brilliantly clear upper layer of solvent and a substantial lower layer of oil, the separated oil amounting to more than 85% of that present in the hot solvent. The precipitated oil is drawn away from the solvent, is dried under vacuum, filtered with a small amount of diatomaceous earth or other suitable filter aid, and is ready for the market. This oil is brilliantly clear, bland in taste and odor, and is of such a high degree of purity that it is essentially non-break on heating to 600° F. The solvent removed from the oil during the period of drying is condensed and later reintroduced into the process.

Soy beans contain, aside from small percentages of other materials, oil, various types of sugars, phosphatides, proteins, and ash. The fats, phosphatides, some of the carbohydrates, and ash, together with small amounts of other substances are soluble in the mixed solvent. The phosphatides are a valuable article of commerce and are known to the trade as soy-lecithin. In the operation of a hydrocarbon or a chlorinated hydrocarbon solvent plant the phosphatides remain with the oil and must be recovered by a rather complicated and expensive method. In our process the phosphatides are easily recovered. We have discovered that through the use of small quantities of a salting out agent such as calcium chloride, which may be dissolved in the solvent, the phosphatides are precipitated in a flocculent form. The calcium chloride, however, remaining in solution in the solvent, therefore, yields a relatively pure phosphatide product. The quantity of calcium chloride used may, for example, be about one gram per pound of solvent extract and the reaction is preferably carried on at room temperature in the solvent extract from which the bulk of the oil has been separated by cooling. Owing to the extreme fineness of the suspended phosphatide particles, it takes 24 to 48 hours for these to settle out. In this instance the clear solvent extract is decanted off from the precipitated phosphatides. These phosphatides are now dried under vacuum, and the solvent recovered for future use. The recovered phosphatides constitute a merchantable product and require no further treatment except for certain special purposes.

The slow separation by settling of the oil from the solvent and of the precipitated phosphatides from the solvent extract may be replaced by the use of more positive forms of separation. For example, a continuous centrifuge is satisfactory in each case.

The present process has the additional advantage over other processes in that it is not necessary completely to distill the solvent from the extracted oil. Cooling and settling, or other means of separation, remove almost all of the oil from the solvent. The solvent extract from which the bulk of the oil has been separated, may be reused as a solvent. However, it contains in solution a small amount of oil, phosphatides, if they have not been removed, and also some carbohydrates and other substances removed from the bean. Continuous reuse of the solvent extract results in the building up of these materials and impairment of the efficiency of the solvent. If desired, the solvent may be reused until its efficiency has dropped and then may completely be redistilled.

We have found, however, that it is advantageous to use a bleed system in which the bulk of the solvent extract is continuously reused but a small proportion thereof is bled off from the system and subjected to distillation. In practice, it has been found with soy beans that more than 50% of the solvent may be so reused and not substantially more than 90%. Preferably the system is operated in reusing approximately 75% of the solvent extract and bleeding from the system approximately 25% thereof for distillation.

When operating a bleed system it has further been found that it is advantageous not to recover phosphatides from the bulk of the solvent extract but to permit the lecithin and other phosphatides to build up in the solvent and only remove them from the bleed portion. This avoids the difficulty of having calcium chloride or other salting out agent present in the solvent extract.

In carrying out the bleed system, therefore, the bleed portion is first treated with a salting out agent such as calcium chloride and the phosphatides separated therefrom. The residual solvent extract is then distilled from the contained solids until the specific gravity of the solution is greater than that of the oil. On cooling, the oil comes to the surface and is easily drawn off. Residual solids are then further subjected to distillation to remove all traces of solvent. The oil, after separation, is dried under vacuum and filtered, and is ready for the market. The residue is essentially a carbohydrate syrup of great concentration and may be mixed with extracted meal or otherwise utilized. For example, it is suitable for use in fermentation processes. The residue contains sterols, ribo-flavin, thiamine, rare sugars, and other constituents which are present in the bean only in small quantities but are found in the residue in relatively concentrated form. These may be recovered by appropriate methods.

The redistilled solvent may be brought back into the system at any point, but in a continuous process it may suitably be introduced in such manner as directly to contact the soy bean flakes leaving the extraction process.

The recovered solvent is, however, preferably handled by a batch procedure in order that the relative proportions of ethanol and isopropanol may be more readily controlled and regulated.

The foregoing detailed description has been given for clearness of understanding only, and no unnecessary limitations should be understood therefrom.

We claim:

1. The method of extracting oil from seeds which comprises contacting the seeds at elevated temperature with a solvent consisting of a mixture of ethanol and isopropanol, the proportion of ethanol to isopropanol being not substantially in excess of 80 to 20 and not substantially less than 70 to 30 by volume dissolving a substantial quantity of oil from the seeds in the solvent and then cooling the solvent sufficiently to cause separation of dissolved oil therefrom.

2. The method of extracting oil from seeds which comprises contacting seeds with a hot solvent mixture consisting of ethanol and isopropanol in which the ethanol is from approximately 70 to 80 parts to 30 to 20 parts by volume of isopropanol at atmospheric pressure, maintaining the contact for a sufficient period to extract substantially all of the oil from the seeds, cooling the solvent extract whereby the bulk of the oil separates from the solvent extract, and separating the oil and the solvent extract.

3. The method of extracting oil from soy beans which comprises contacting soy beans with a hot solvent mixture consisting of ethanol and isopropanol in which the ethanol is from approximately 70 to 80 parts to 30 to 20 parts by volume of isopropanol at atmospheric pressure, maintaining the contact for a sufficient period to extract substantially all of the oil from the soy beans, cooling the solvent extract whereby the bulk of the oil separates from the solvent extract, and separating the oil and the solvent extract.

4. The method as set forth in claim 3, in which the solvent extract after separation from the oil is treated with a salting out agent in proportions substantially to free the solvent extract from phosphatides, and the residual solvent extract is separated from the phosphatides.

5. The method of recovering lechithin from oil-bearing seeds containing the same which comprises contacting the seeds with a hot solvent mixture consisting of ethanol and isopropanol in which the ethanol is from approximately 70 to 80 parts to 30 to 20 parts by volume of isopropanol at atmospheric pressure, cooling the solvent extract whereby the bulk of the extracted oil separates therefrom, treating the residual solvent extract with a salting outagent whereby lecithin is precipitated therein, and separating the lecithin precipitate therefrom.

6. The method as set forth in claim 5, in which the salting out agent is calcium chloride.

7. The method of recovering lecithin from oil-bearing soy beans containing the same which comprises contacting the soy beans with a hot solvent mixture consisting of ethanol and isopropanol in which the ethanol is from approximately 70 to 80 parts to 30 to 20 parts by volume of isopropanol at atmospheric pressure, cooling the solvent extract whereby the bulk of the extracted oil separates therefrom, treating the residual solvent extract with a salting out agent whereby lecithin is precipitated therein, and separating the lecithin precipitate therefrom.

8. The method of extracting oil from seeds which comprises contacting the seeds at elevated temperature with a solvent comprising approximately 75% ethanol and 25% isopropanol.

P. A. SINGER.
H. J. DEOBALD.